United States Patent [19]

Siol et al.

[11] Patent Number: 5,483,003
[45] Date of Patent: Jan. 9, 1996

[54] THERMOPLASTICALLY PROCESSIBLE ELASTOMERS WITH IMPROVED OPTICAL PROPERTIES

[75] Inventors: Werner Siol, Darmstadt; Klaus Koralewski, Riedstadt, both of Germany

[73] Assignee: Roehm GmbH Chemische Fabrik, Darmstadt, Germany

[21] Appl. No.: 214,491

[22] Filed: Mar. 18, 1994

[30] Foreign Application Priority Data

Mar. 26, 1993 [DE] Germany .......................... 43 09 853.3

[51] Int. Cl.$^6$ .......................... C08L 33/10; C08L 33/08
[52] U.S. Cl. .......................... 525/309; 525/308
[58] Field of Search .......................... 525/309, 308

[56] References Cited

U.S. PATENT DOCUMENTS

| | | | |
|---|---|---|---|
| 5,155,172 | 10/1992 | Siol et al. | 525/308 |
| 5,219,931 | 6/1993 | Siol et al. | 525/63 |
| 5,231,131 | 7/1993 | Chu et al. | 524/504 |
| 5,280,073 | 1/1994 | Siol et al. | 525/227 |

FOREIGN PATENT DOCUMENTS

| | | |
|---|---|---|
| 0381065 | 1/1990 | European Pat. Off. . |
| 0357036 | 3/1990 | European Pat. Off. . |
| 0522376 | 1/1993 | European Pat. Off. . |
| 4121652A1 | 6/1991 | Germany . |

Primary Examiner—W. Robinson H. Clark
Attorney, Agent, or Firm—Oblon, Spivak, McClelland, Maier & Neustadt

[57] ABSTRACT

Thermoplastically processible elastomers based on acrylates, which contain 40–100 wt. % of one or more comb polymers having a molecular weight greater than 50,000 Dalton, comprised of:

(A) 5–50 wt. % of macromonomers comprised of methyl methacrylate or copolymers of methyl methacrylate with comonomers chosen from other (meth)acrylic acid esters and styrenes;

containing a terminal unit with a radically polymerizable group and having a glass transition temperature (Tg) of at least 60° C., a molecular weight in the range 500–100,000 Dalton, and an index of refraction in the range $n_D$=1.48–1.50;

(B) 5–90 wt. %, based on the total weight of the comb polymer, of monomers or monomer mixtures of formula I:

$$CH_2=\underset{\underset{H}{|}}{C}-COOR_1 \quad (I)$$

where $R_1$ is a $C_1$–$C_{12}$-alkyl group; and (C) 5–50 wt. % based on the total weight of the comb polymer, of a phenyl group-containing radically polymerizable monomer.

3 Claims, No Drawings

THERMOPLASTICALLY PROCESSIBLE ELASTOMERS WITH IMPROVED OPTICAL PROPERTIES

BACKGROUND OF THE INVENTION

1. Field of the Invention

The invention relates to thermoplastically processible elastomers based on comb polymers with improved optical properties, in particular high transparency.

2. Discussion of the Background

The polymers derived from monomeric "soft" acrylate esters can extend over the entire range from soft elastomers to hard, non-film-forming elastics, depending on the content of "hard" comonomers in the polymer (see Kirk-Othmer, 1978, "Encyclopedia of Chemical Technology", 3rd Ed Vol 1 pub. J. Wiley, pp. 386–408). The typical elastomeric polyacrylates are distinguished by good oil resistance and relatively high thermal stability. However, their mechanical properties at cold temperatures and elevated temperatures leave something to be desired.

DE-A 39 02 653 and U.S. Pat. No. 5,155,172 describe elastomers based on acrylates containing 40–100 wt. % of one or more copolymers, with molecular weights greater than 50,000 Dalton, comprised of acrylate monomers in the amount of 50–95 wt. %, and macromonomers comprised of a vinyl group and a polyvinyl unit covalently bonded thereto, selected from the group consisting of the acrylates, the methacrylates, and the (possibly substituted)styrenes.

According to DE-A 39 02 653, with appropriate limits on the molecular weight, the resulting comb polymers are thermoplastically processible elastomers (TPEs). Comb polymers with, e.g. a polybutylacrylate main chain and polymethylmethacrylate (PMMA) side chains are as rule highly transparent when the PMMA side chains are strongly bound to the butyl acrylate main chain, even though there is an appreciable difference between the index of refraction of the PMMA hard phase ($n_D^{20}$ of PMMA=1.492) and that of the polybutyl acrylate phase ($n_D^{20}$ of PBuA=1.466). It is possible to explain this result based on the assumption of very small PMMA domains (see Platzer, N. A. J., Ed., 1971, "Multicomponent polymer systems", Adv in Chem Ser , 99, pub. Am. Chem. Soc., pp. 12–13).

In the interest of maximally unconstrained processing and application of thermoplastically processible elastomers, it is necessary to have systems with constant optical behavior which are not appreciably affected by prior treatment and the processing conditions. Accordingly, the underlying problem of the invention is to devise TPEs which have the desired optical properties, particularly transparency, independently of phase structure or domain size, even in mixtures with PMMA. It has been discovered, in connection with the invention, that, starting with the comb polymers of DE-A 39 02 653 (U.S. Pat. No. 5,219,931)and EP-A 0381065, (U.S. Pat. No. 5,155,172) one may obtain thermoplastically processible elastomers (TPEs) with improved optical properties by copolymerizing with phenyl group-containing monomers.

SUMMARY OF THE INVENTION

The invention relates to thermoplastically processible elastomers E based on acrylates, which elastomers comprise 40–100 wt. % of one or more comb polymers CP having a molecular weight greater than 50,000 Dalton, comprised of:

(A) 5–50 wt. %, preferably 20–40 wt. %, of a macromonomer (MM) comprised of methyl methacrylate or copolymers of methyl methacrylate with comonomers chosen from the group of other (meth)acrylic acid esters, preferably of $C_1$–$C_{12}$ alcohols, and (possibly substituted)styrenes, containing a terminal unit with a radically polymerizable group having a glass temperature Tg of at least 60° C. a molecular weight in the range 500–100,000 Dalton, and an index of refraction in the range $n_D$=1.48–1.50;

(B) 5–90 wt. %, preferably 50–80 wt. % (based on the total weight of the monomers in CP) of monomers or monomer mixtures of formula I:

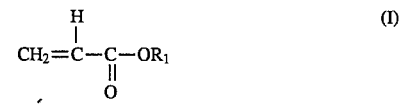

where $R_1$ represents $C_1$–$C_{12}$ alkyl group; and (C) 5–50 wt. %, preferably 10–30 wt. %, of a phenyl group-containing radically polymerizable monomer (PHM), wherein the monomer groups (B) and (C) are preferably in a weight ratio in the range 10:1 to 1:2. Preferably $R_1$ in formula I represents a $C_4$-alkyl group, e.g. n-butyl.

The phenyl group-containing monomers PHM are preferably selected from (1) the monomers of formula III:

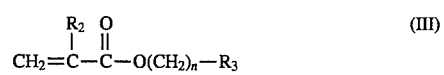

where $R_2$ represents hydrogen or methyl;

$R_3$ represents a phenyl group, possibly substituted; and n represents 0, 1, 2, or 3; and (2) the monomers of formula IV:

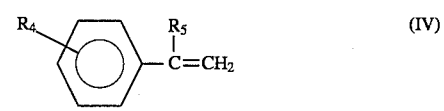

where $R_4$ represents hydrogen of a $C_1$–$C_4$-alkyl group and $R_5$ represents hydrogen or a methyl group.

If $R_3$ represents a substituted phenyl group, the substituent(s) is/are one or two $C_1$–$C_4$ alkyl group(s).

The monomers of formula I and the phenyl group-containing monomers PHM are generally present in the ratio of 10:1 to 1:2 by weight, particularly 3:1. The monomer PHM is preferably benzyl acrylate. As a rule, the proportions of (A), (B) and (C) are such that their sum is 100 wt. %.

DESCRIPTION OF THE PREFERRED EMBODIMENTS

The macromonomers:

By definition, macromonomers are polymers with a polymerizable (particularly, radically polymerizable) terminal group, having molecular weights in the range 500 to about 100,000 Dalton, preferably in the range 2,000–50,000 Dalton. The manufacture of macromonomers is described in detail in the literature (Rempp, P. F., and Franta, E., 1984 Adv.Polym.Sci., 58, 1; Albrecht, K., and Wunderlich, W., Angew.Macromol.Chem., 145/46, 89–100; Mark, H., et al., 1987, "Encyclopedia of Polymer Science and Technology", 2nd Ed Vol 9 pub J. Wiley & Sons, pp. 195–204; Rempp, P. Franta, E., Masson, P., and Lutz, P., 1986 Progr.Colloid & Polymer Sci., 72,112–118).

Methods for producing macromonomers by anionic and cationic "living polymerization" techniques are known, as are radical polymerization techniques, wherein a polymerizable end group is customarily introduced by initiation or by chain cleavage, and/or a subsequent chemical reaction.

$R_6$ represents hydrogen or a $C_1$–$C_4$-alkyl group; and

X represents a $C_1$–$C_4$- alkylidene group, preferably an alkylidene group which contains at least one oxygen, sulfur, or nitrogen atom. Particularly preferred are X groups of the following types:

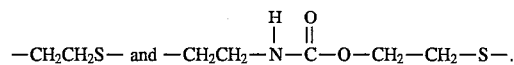

Examples are macromolecules of formula II':

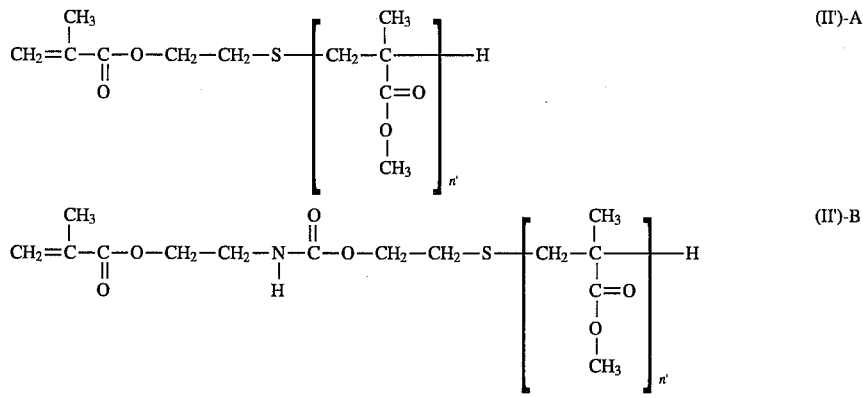

The macromonomers MM to be employed according to the invention may be produced, in particular, according to the teaching of DE-A 39 02 653 which disclosed a particularly interesting class of macromonomers (or mixtures), those of formula II:

where $R'_2$ represents hydrogen or methyl;

R represents hydrogen or a $C_1$–$C_4$-alkyl group;

Y represents a group

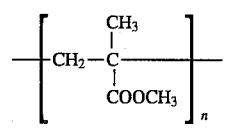

Q represents a bifunctional connecting group; and n is an integer chosen such that the molecular weight of the macromonomer(s) is in the range 500–100,000 Dalton.

The bifunctional group Q is preferably

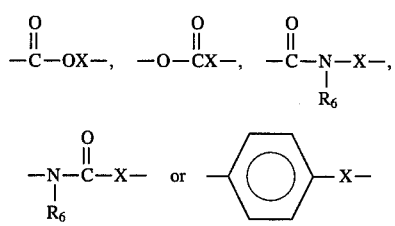

where where n' is 10–500.

The macromonomers MM may be manufactured by a method which is per se known. For instance the macromonomers of formula II' may be advantageously produced starting with a precursor of formula V, which is a compound containing a terminal hydroxyl group:

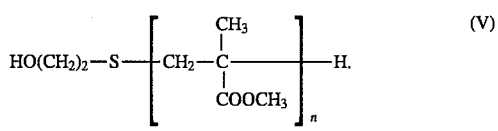

This is reacted in an acylation reaction which provides a methacryloyl group, e.g. using methacrylic acid anhydride. The procedure can be as follows:

Advantageously one employs radical polymerization (Rauch-Puntigum, H., and Voelker, The., 1967, "Acryl- und Methacrylverbindungen", pub. Suringer-Verlag, Berlin). The molecular weights may be determined by known methods, e.g. by viscosity measurement or gel permeation chromatography (see Mark, H. F., et al., Encyclopedia of Polymer Scinece and Engineering, Vol. 10, pp. 1–19 J. Wiley 1987). The glass transition temperature Tg is determined according to Vieweg-Esser, 1975, "Kunststoff-Handbuch", Vol. 9, pub. Carl Hanser Verlag, pp. 333–340.

To produce the compounds of formula V, the methyl methacrylate is polymerized with addition of mercaptoethanol, in a suitable reactor equipped with a stirrer and heater, preferably under a protective gas such as nitrogen or argon as is commonly used in the art, and with addition of a radical initiator, e.g. an azo initiator, such as azoisobutyronitrile. Advantageously the duration of the polymerization is on the order of one workday. The product may be taken up in a solvent, such as acetone, and can be precipitated, e.g. with petroleum ether. Alternatively it may be used directly for reaction with the acylating agent.

The reaction with the acylating agent, e.g. a methacrylic acid anhydride, may be carried out in a suitable inert solvent, such as toluene, and in the presence of an acid acceptor, such as a trialkylamine, preferably with heating, over a certain period, e.g. 24 hr. The isolation of the macromonomers can be accomplished by all known procedures, e.g., by precipitation, possibly with methanol.

The comb polymers CP may be synthesized from the macromonomers MM in a manner which is per se known, in the form of a solution polymerization. Candidates for use as the solvent are butylacetate or toluene.

Advantageously the macromonomers MM are added along with the monomers of formula I and the phenyl group-containing monomers PM in the solvent in a suitable polymerization vessel with stirrer and heater, and the polymerization initiator, e.g. a peroxide compound such as tert-butyl perpivalate, is added under heating (suggestion c. 50° C.), in an amount which is customary in the art, e.g. 0.001–1 wt % based on the monomers, preferably under an inert protective gas. The polymerization is carried out for a certain period, e.g. 10 hours. The polymers formed may be precipitated out, e.g. by addition of methanol. One may produce highly transparent, colorless films from the resulting polymers by pour casting, e.g. using butylacetate as a solvent. An alternative method of recovering the comb polymers is to degas the solution of the comb polymers in a degassing extruder.

The inventive thermoplastically processable elastomers EP may also contain additives which are per se known, such as stabilizers, processing aids, and the like, in the customary amounts (see Gaechter-Mueller, 1979, "Kunststoff-Additive", pub. Carl Hanser Verlag; and 1992 "Ullmann's encyclopedia of industrial chemistry", 5th Ed Vol- A20, pub VCH, pp. 459–507).

In the inventive comb polymers the index of refraction of the elastomeric polyacrylate phase is adjusted to that of the "hard" PMMA phase. One result of this adjustment is to make it possible to incorporate the comb polymers into polymethyl methacrylate, e.g. in molding compounds comprising PMMA, without encountering problems with the transparency of the composition in which PMMA has been thus modified to add impact strength.

The type of embodiment with monomers of formula III is particularly advantageous, particularly when the monomer is benzylacrylate. For example, benzylacrylate has been advantageously used as an impact strength modifier in PMMA itself (see DE-A 41 21 652.0). Whereas the impact-strength modified molding compounds according to the state of the art as a rule comprise a matrix consisting of a PMMA phase with embedded particles of crosslinked acrylate rubber, the inventive comb polymers comprise TPEs with a matrix consisting of an acrylate phase which is physically crosslinked by the embedding of PMMA hard phase particles. In addition to the improved optics of the TPEs themselves, the optical adjustment of the acrylate phase to the PMMA phase affords advantages when the TPE is incorporated into PMMA molding compounds or when PMMA is used as an extender in the TPE.

The following non-limiting examples serve to illustrate the invention. The following methods of determination of parameters were used for characterizing the polymers:

Viscosity, J (ml/g)—according to IZOD 1628-6, and DIN 7745 Part 2;

Resistance to tearing, $\sigma_R$ (MPa)—according to DIN 53 455;

Elongation at tearing, $\epsilon R$ (%)—according to DIN 53 455.

EXAMPLE 1

Comb polymer with polybutylacrylate-benzylacrylate main chain and PMMA side chain:

90 g of a PMMA macromonomer according to Example 2 (Tg>100° C.) was dissolved with 157.5 g butylacrylate and 52.5 g benzylacrylate, in 300 g butylacetate, and polymerization was carried out at 50° C. under addition of 0.5 g butylperpivalate, for 8 hr, to produce a solution of the comb polymer. The polymer was precipitated out with methanol. J=198 ml/g. Films ca. 0.5 mm thick were produced by pour-casting a solution of the polymer product in butyl acetate. The resulting films were highly transparent. They had elongation at tearing $\epsilon_R$=486%, and tearing strength $\sigma_R$=10.34 MPa.

EXAMPLE 2

PMMA macromonomer of formula (II')-A:

A mixture of 200 g methyl methacrylate, 4 g mercaptoethanol, and 0.2 g azoisobutyronitrile was polymerized in a plastic bag for 48 hr at 50° C., under a protective gas. Then precipitation with methanol was carried out, and the precipitate was dried in vacuum ($M_w$=10,400). The resulting polymer of formula V was dissolved in 320 g toluene. After addition of 16 g triethylamine and 16 g methacrylic acid anhydride, the mixture was heated to 45° C. under inert gas, and was allowed to stand at this temperature for 24 hours. The macromonomer was isolated by precipitation with methanol. J=12.2 ml/g. Tg>100° C.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A thermoplastically processable elastomer composition comprising 40–100 wt. % of a comb polymer of improved optical properties, said polymer having a molecular weight greater than 50,000 Daltons, said comb polymer comprising a main chain having macromonomer side chains pendant therefrom, said macromonomer containing a terminal unit with a radically polymerizable group, said group constituting a monomer unit of said main chain, said comb polymer main chain comprising:

(A) 5–50 wt. % of a hydrophobic macromonomer consisting essentially of polymerized methyl methacrylate or a polymerized copolymer of methyl methacrylate with comonomers chosen from other (meth)acrylic acid esters and styrenes, wherein said macromonomer contains a terminal unit with a radically polymerizable group, and has a glass transition temperature Tg of at least 60° C., a molecular weight in the range 500–100,000 Dalton, and an index of refraction in the range $n_D$=1.48–1.50;

(B) 5–90 wt. %, based on the total weight of said comb polymer, of monomers or monomer mixtures of formula I:

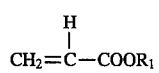

where $R_1$ is a $C_1$–$C_{12}$-alkyl group; and (C) 5–50 wt. %, based on the total weight of said comb polymer, of a phenyl group-containing radically polymerizable monomer of formula III,

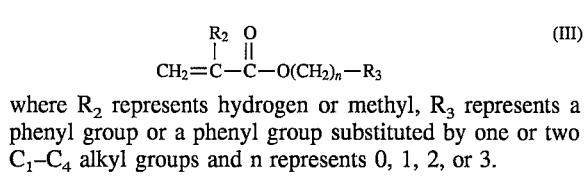
where $R_2$ represents hydrogen or methyl, $R_3$ represents a phenyl group or a phenyl group substituted by one or two $C_1$–$C_4$ alkyl groups and n represents 0, 1, 2, or 3.
2. The comb polymer of claim 1 wherein said monomer of formula III is benzylacrylate.
3. Thermoplastically processible elastomers according to claim 1 wherein $R_1$ in formula I represents butyl.
* * * * *